US011859643B2

(12) United States Patent
Peer

(10) Patent No.: US 11,859,643 B2
(45) Date of Patent: Jan. 2, 2024

(54) RETAINER NUT ASSEMBLY FOR PUMP AND METHODS

(71) Applicant: SPM Oil & Gas Inc., Fort Worth, TX (US)

(72) Inventor: Richard D. Peer, Crowley, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 5 days.

(21) Appl. No.: 17/531,019

(22) Filed: Nov. 19, 2021

(65) Prior Publication Data

US 2023/0160402 A1 May 25, 2023

(51) Int. Cl.
*F15B 15/26* (2006.01)
*F04B 53/14* (2006.01)
*F04B 51/00* (2006.01)

(52) U.S. Cl.
CPC .............. *F15B 15/26* (2013.01); *F04B 51/00* (2013.01); *F04B 53/14* (2013.01)

(58) Field of Classification Search
CPC ................................ F16K 27/12; F16B 15/26
See application file for complete search history.

(56) References Cited

U.S. PATENT DOCUMENTS 3,051,348 A * 8/1962 Redman .................. F16K 15/06 220/284
3,259,075 A 7/1966 Roth
3,430,575 A 3/1969 Roth
4,725,176 A * 2/1988 Connolly ................ B25B 29/02 411/548
5,553,982 A * 9/1996 Hashikawa ............... F16D 1/08 411/917
6,685,406 B2 * 2/2004 Whitney ................. F16B 31/04 411/917
8,402,880 B2 3/2013 Patel et al.
8,480,340 B2 * 7/2013 Riestra .................... F16B 31/02 411/434
9,188,146 B1 * 11/2015 Trautman ................ F16B 31/04
10,962,001 B2 3/2021 Nowell et al.
2018/0023661 A1 * 1/2018 Early .................... F16C 35/077 74/572.11
2019/0264683 A1 8/2019 Smith
2020/0080660 A1 * 3/2020 Dyer ....................... F04B 53/16

* cited by examiner

*Primary Examiner* — Connor J Tremarche

(57) ABSTRACT

A retainer nut assembly for a fluid end of a pump system includes a fastener with a generally cylindrical configuration, first and second ends, external threads configured to engage corresponding threads of a fluid end block, and a cavity formed at the first end. A suction cap is configured to sealingly fit to the fluid end block. A load piston is movably disposed in the cavity adjacent the suction cap. A bore is formed through the fastener in communication with the cavity and provided with hydraulic fluid. A pressure piston is movably disposed in the bore. A threaded passageway is formed through the fastener in communication with the bore and open to the second end. A locking bolt is disposed in the threaded passageway and, when inserted into the threaded passageway, contacts the pressure piston and generates fluid pressure on the load piston.

20 Claims, 7 Drawing Sheets

RETAINER NUT ASSEMBLY FOR PUMP AND METHODS

TECHNICAL FIELD

The present disclosure relates to pump assemblies and, in particular, retainer nut assemblies for such pump assemblies and methods of assembly.

BACKGROUND

In hydraulic fracturing, and other similar applications, the pumping equipment used to pump fluid media into a well is an important part of the fracturing system and process. Reciprocating pump systems have been used for decades to propel a fluid media, typically a mixture of water, sand and chemicals, for example, into a well at high pressures and flow rates. Increasing demands of pressure pumping has required such pumps to evolve by increases in size, horsepower rating, and pressure capabilities. As a result, designing pump assemblies to be reliable and easily maintained has become an increasingly important consideration.

Reciprocating pump systems typically include fluid end blocks with fluid inlet and outlet passages for the fluid media. Each of the fluid inlets and fluid outlets include a check valve to control the flow of fluid through the fluid end block. Such pump systems have a plunger that generates the substantial pumping pressures required to pump the fluid media through the pump. Pump systems typically have both a cover assembly and a retainer nut for access to the inner workings of the fluid end of the pump for initial assembly and maintenance.

Current hydraulic fracturing fluid ends typically require a threaded retainer nut to retain a suction cap in position in the fluid end block. To tighten the retainer nut, the use of a hammer wrench and a sledgehammer are typically required to generate a preload in the threads. The use of the hammer can give an imprecise result and is a swinging mass that exposes the user to harm. Due the nature of the pumping process and high forces generated in the fluid end block, the retainer nut can work loose. This creates the potential of the retainer nut being forcefully ejected from the fluid end block and/or may cause damage to the block itself.

U.S. Pat. No. 8,402,880 discloses a pump system with a fluid block. A retaining system secures a closure at an installed position within a bore of the fluid block. The bore has screw threads along at least a portion thereof. The closure has an internally threaded hold extending therein. The closure in the installed position closes the bore. The retaining system includes a retaining cover or nut for holding the closure in the bore. The retaining nut has external threads that are engageable with the screw threads of the bore such that the cover is rotatable relative to the housing in a tightening direction for movement of the cover into the bore toward the closure and rotatable in an opposite, loosening direction for movement of the cover out from the bore away from the closure.

There is a need for an easily assembled and reliable retainer nut for a fluid end of a pump system. Devices and methods according to the disclosure satisfy the need.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, the disclosure includes a retainer nut assembly for a fluid end of a pump system including a fastener comprising a generally cylindrical configuration, first and second ends, external threads configured to engage corresponding threads of a fluid end block, and a cavity formed at the first end. A suction cap is shaped and sized to sealingly fit to the fluid end block. A load piston is movably disposed in the cavity and adjacent the suction cap. A bore is formed through the fastener in communication with the cavity and provided with a hydraulic fluid. A pressure piston is movably disposed in the bore. A threaded passageway is formed through the fastener in communication with the bore and open to the second end and a locking bolt is disposed in the threaded passageway configured, when inserted into the threaded passageway to contact the pressure piston and generate fluid pressure on the load piston with the hydraulic fluid.

In another aspect, the disclosure includes a fluid end for a reciprocating pump system including a fluid end block defining a fluid chamber. A plunger is reciprocally disposed in the fluid chamber to generate fluid pressure therewithin. An outlet fluid passage is formed in the fluid end block in fluid communication with the fluid chamber, the outlet fluid passage including an outlet valve. An inlet fluid passage is formed in the fluid end block in fluid communication with the fluid chamber, the inlet fluid passage including an inlet valve. A retainer nut assembly for the fluid end of the pump system includes a fastener including a generally cylindrical configuration, first and second ends, external threads configured to engage corresponding threads of a fluid end block, and a cavity formed at the first end. A suction cap is shaped and sized to sealingly fit to the fluid end block. A load piston is movably disposed in the cavity and adjacent the suction cap. A bore is formed through the fastener in communication with the cavity and provided with a hydraulic fluid. A pressure piston is movably disposed in the bore. A threaded passageway is formed through the fastener in communication with the bore and open to the second end and a locking bolt is disposed in the threaded passageway configured, when inserted into the threaded passageway to contact the pressure piston and generate fluid pressure on the load piston with the hydraulic fluid.

In yet another aspect, the disclosure includes a method of installing a retainer nut assembly into a fluid end block for a reciprocating pump system, the method including threading a fastener portion into the fluid end block, tightening a locking bolt disposed in the fastener and engaged therewith via threads, engaging and advancing a pressure piston disposed in a bore of the fastener with the locking bolt, generating fluid pressure in the bore with the pressure piston, applying the fluid pressure to a load piston, and generating, with the load piston, a force on a section cap installed in the fluid end block.

DETAILED DESCRIPTION

Figure 1:
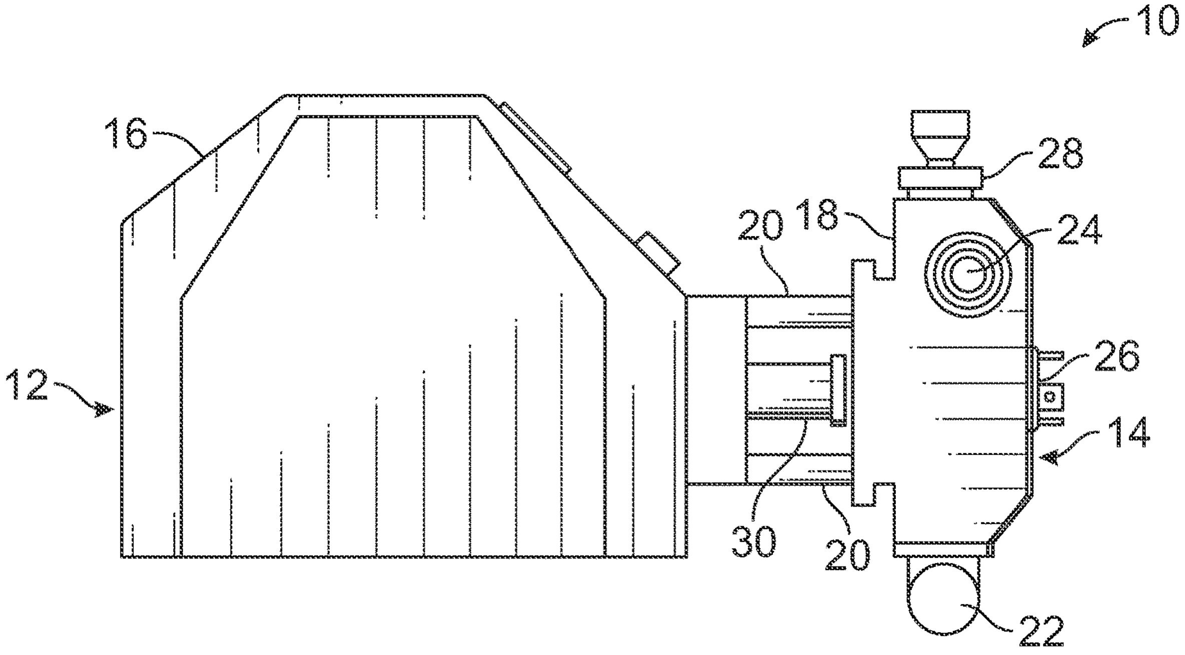
FIG. 1 is an elevation view of a reciprocating pump system according to an exemplary embodiment, the reciprocating pump system including a fluid end.

Now referring to the drawings, wherein like elements refer to like reference numbers, there is illustrated in FIG. 1 an exemplary embodiment of a reciprocating pump system (generally referred to by the reference numeral 10) including a power end portion 12 and a fluid end portion 14 operably coupled thereto. The power end portion 12 includes a housing 16 in which a crankshaft (not shown) is disposed, as is known, the crankshaft being operably coupled to an engine or motor (not shown), as is known, which is configured to drive the crankshaft. The fluid end portion 14 includes a fluid end block 18, which is connected to the housing 16 via a plurality of stay rods 20. The fluid end block 18 includes a fluid inlet passage 22 and a fluid outlet passage 24, which are spaced in a parallel relation. A plurality of fluid end retainer nut assemblies 26, one of which is shown in FIG. 1, is connected to the fluid end block 18 opposite the stay rods 20. A plurality of cover assemblies 28, one of which is shown in FIG. 1, is connected to the fluid end block 18 opposite the fluid inlet passage 22. A plunger rod assembly 30 extends out of the housing 16 and into the fluid end block 18. Other configurations of a reciprocating pump system 10 are contemplated.

Figure 2:
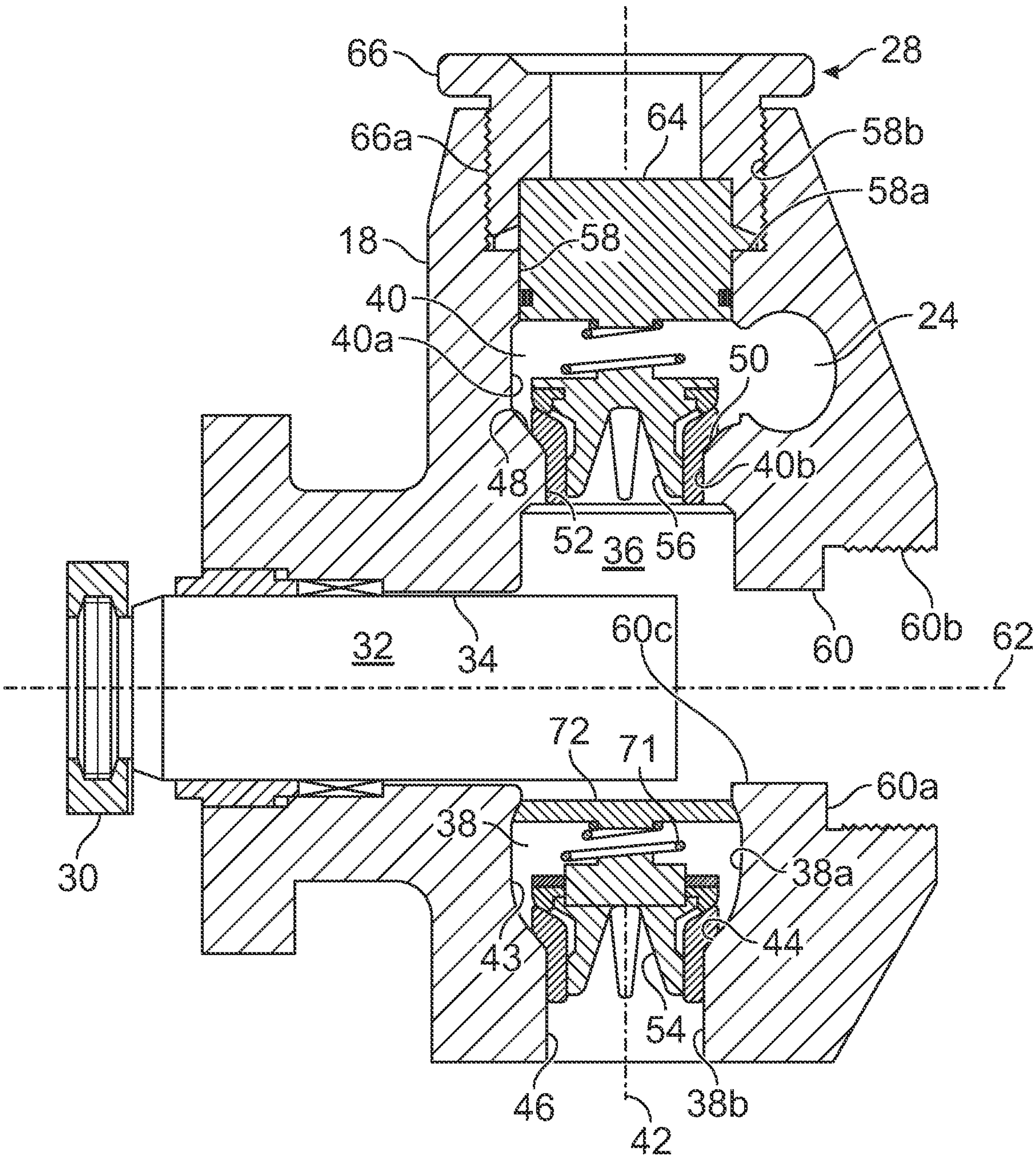
FIG. 2 is a section view of the fluid end of FIG. 1 according to an exemplary embodiment, the fluid end including a fluid end block or housing and inlet and outlet valves.

In embodiments, as illustrated in FIG. 2 with continuing reference to FIG. 1, the plunger rod assembly 30 includes a plunger 32, which extends through a bore 34 formed in the fluid end block 18, and into a fluid chamber 36 formed in the fluid end block 18. The plunger 32 is reciprocally disposed in the fluid chamber 36 to generate fluid pressure therewithin. In embodiments, a plurality of parallel-spaced bores may be formed in the fluid end block 18, with one of the bores being the bore 34, a plurality of fluid chambers may be formed in the fluid end block 18, with one of the fluid chambers being the fluid chamber 36, and a plurality of parallel-spaced plungers may extend through respective ones of the bores and into respective ones of the fluid chambers, with one of the plungers being the plunger 32.

The fluid end block 18 includes inlet and outlet fluid passages 38 and 40 formed therein, which are generally coaxial along a fluid passage axis 42. Under conditions to be described below, fluid flows from the inlet fluid passage 38 toward the outlet fluid passage 40 along the fluid passage axis 42. The fluid inlet passage 22 is in fluid communication with the fluid chamber 36 via the inlet fluid passage 38. The fluid chamber 36 is in fluid communication with the fluid outlet passage 24 via the outlet fluid passage 40.

The inlet fluid passage 38 may include an enlarged-diameter portion 38*a* and a reduced-diameter portion 38*b* extending downward therefrom (as in the figure), which direction may also be considered the upstream direction. Downstream from the enlarged-diameter portion 38*a* is an inlet fluid passage neck 38*c*, which is reduced in diameter relative to the enlarged-diameter portion.

The enlarged diameter portion 38*a* defines a tapered internal shoulder 43 and thus a frusto-conical surface 44 of the fluid end block 18. The reduced-diameter portion 38*b* defines an inside surface 46 of the fluid end block 18. Similarly, the outlet fluid passage 40 includes an enlarged-diameter portion 40*a* and a reduced-diameter portion 40*b* extending downward therefrom. The enlarged-diameter portion 40*a* defines a tapered internal shoulder 48 and thus a frusto-conical surface 50 of the fluid end block 18. The reduced-diameter portion 40*b* defines an inside surface 52 of the fluid end block 18. The frusto-conical surfaces 44, 50 form valve seats for respective inlet and outlet valves 54, 56.

An inlet valve 54 is disposed in the inlet fluid passage 38, and engages at least the frusto-conical surface 44 and the inside surface 46. Similarly, an outlet valve 56 is disposed in the outlet fluid passage 40, and engages at least the frusto-conical surface 50 and the inside surface 52. In an exemplary embodiment, each of valves 54 and 56 is a spring-loaded valve that is actuated by a predetermined differential pressure thereacross.

A counterbore 58 is formed in the fluid end block 18, and is generally coaxial with the outlet fluid passage 40 along the fluid passage axis 42. In embodiments, the fluid end block 18 may include a plurality of parallel-spaced counterbores, one of which may be the counterbore 58, with the quantity of counterbores equaling the quantity of plunger throws included in the pump system 10. The cover assembly 28 shown in FIGS. 1 and 2 includes at least a plug 64 and a fastener 66. In embodiments, the cover assembly 28 may be disconnected from the fluid end block 18 to provide access to, for example, the counterbore 58, the fluid chamber 36, the plunger 32, the outlet fluid passage 40 or the outlet valve 56. In embodiments, the pump system 10 may include a plurality of plugs, one of which is the plug 64, and a plurality of fasteners, one of which is the fastener 66, with the respective quantities of plugs and fasteners equaling the quantity of plunger throws included in the pump system 10.

A counterbore 60 is formed in the fluid end block 18, and is generally coaxial with the bore 34 along an axis 62. The counterbore 60 defines an internal shoulder 60*a* and includes an internal threaded connection 60*b* adjacent the internal shoulder 60*a*. In embodiments, the fluid end block 18 may include a plurality of parallel-spaced counterbores, one of which may be the counterbore 60, with the quantity of counterbores equaling the quantity of plunger throws included in the pump system 10. The counterbore 60 is sized and shaped to receive a retainer nut assembly 26 (see FIGS. 3-6) according to embodiments disclosed herein. In embodiments, the retainer nut assembly 26 may be disconnected from the fluid end block 18 to provide access to, for example, the counterbore 60, the fluid chamber 36, the plunger 32, the inlet fluid passage 38, or the inlet valve 54. The retainer nut assembly 26 may then be reconnected to the fluid end block in accordance with the foregoing. In several exemplary embodiments, the pump system 10 may include a plurality of plugs, one of which is the plug 68, and a plurality of fasteners, one of which is the fastener 70, with the respective quantities of plugs and fasteners equaling the quantity of plunger throws included in the pump system 10.

Focusing now on the inlet fluid passage 38, a biasing member 71 is positioned within the inlet fluid passage 38. The biasing member 71 may be a coil spring. In one embodiment the biasing member 71 is a conical coil spring. The biasing member 71 may be retained in place by a spring stop 72 as is known. When installed as shown in FIG. 2, the biasing member 71 exerts a selected biasing force on the inlet valve 54 that holds the inlet valve against the frusto-conical surface 44 to create a closed or sealed condition. When a pressure differential on the inlet valve 54 exceeds the closing force generated by the biasing member 71, the inlet valve opens and permits fluid media to enter the fluid chamber 36.

Turning to FIGS. 3-6, the retainer nut assembly 26 includes a fastener 70 that is sized and shaped to be threaded, i.e., advanced, into the fluid end block 18 via an external thread 70*a* of the fastener 70. The external thread 70*a* is configured to engage with the internal threads 60*b* of the counterbore 60. The external thread 70*a* is formed at a first end 70*b* of the generally cylindrical fastener 70. The thread 70*a* may be segmented to permit fluid to escape from inside the fluid chamber 36. The fastener 70 holds a load piston 104, which abuts and holds in place a suction cap or plug 68 in the fluid end block 18 when installed.

The retainer nut assembly 26 includes a mechanism to preload the assembly when installed in the fluid end block 18 to reduce cyclical changes in force on the threaded connection 70*a*, 60*b* due to the large changes in pressure generated inside the fluid end block. The large changes in pressure can cause alternating stress on the threaded connection 70*a*, 60*b*, which can cause the retainer nut assembly to loosen and the threads of the fastener to fatigue. Moreover, failure of the fluid end portion 14 can occur from the large amplitude of alternating stress and resulting damage caused to the retainer nut assembly 26. For example, cracks can develop in the fluid end portion 14 from high cyclic stress. The retainer nut assembly 26 also may include a mechanism to determine if the assembly is preloaded a specified amount. Both of these mechanisms will be detailed hereinbelow.

The plug 68 is sized and shaped to be disposed in the counterbore 60, engaging the internal shoulder 60*a* and sealingly engaging an inside cylindrical surface defined by the reduced-diameter portion of the counterbore 60. In an exemplary embodiment, the plug 68 may be characterized or referred to as a suction cap. The load piston 104 may be provided with an annular load seal 110 disposed in an annular load groove 112 that is formed on the outer, circular periphery of the load piston.

Figure 6:
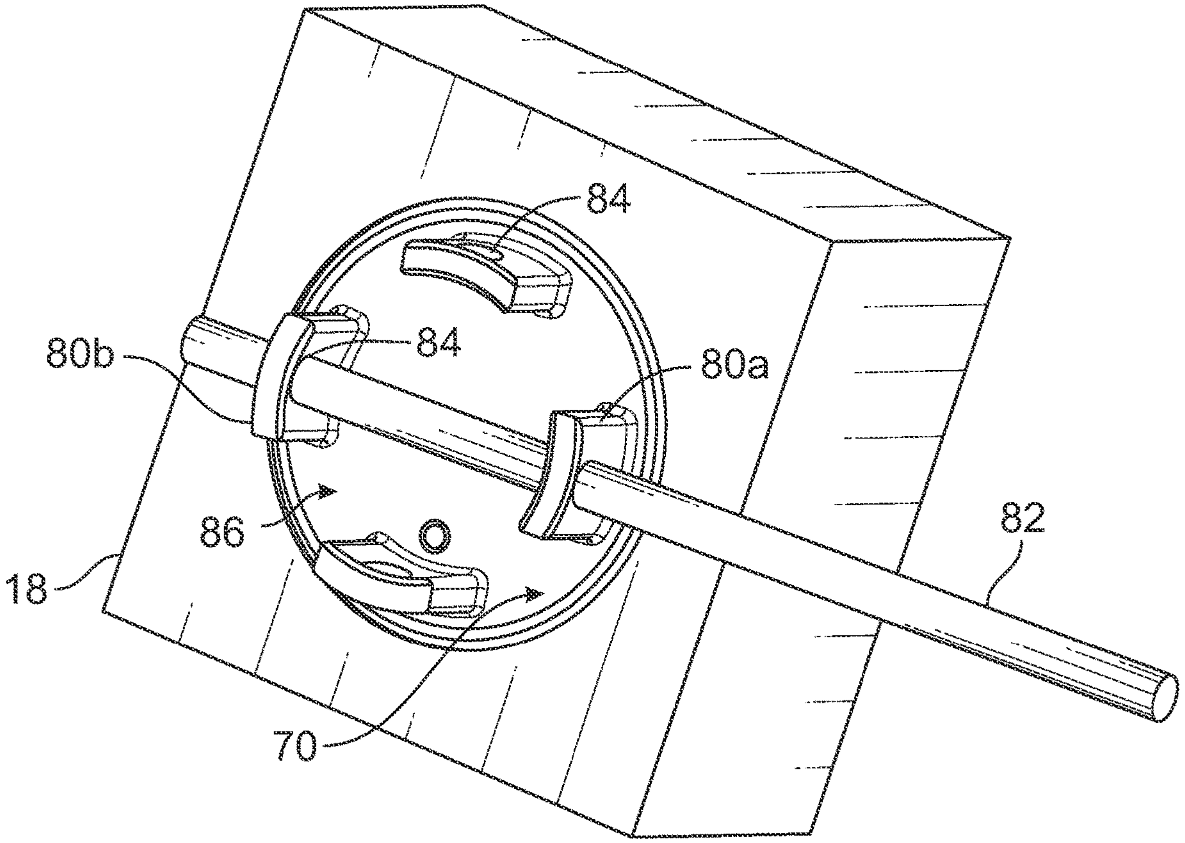
FIG. 6 is a perspective view of a retaining nut engaged with a tool.
Figure 7:
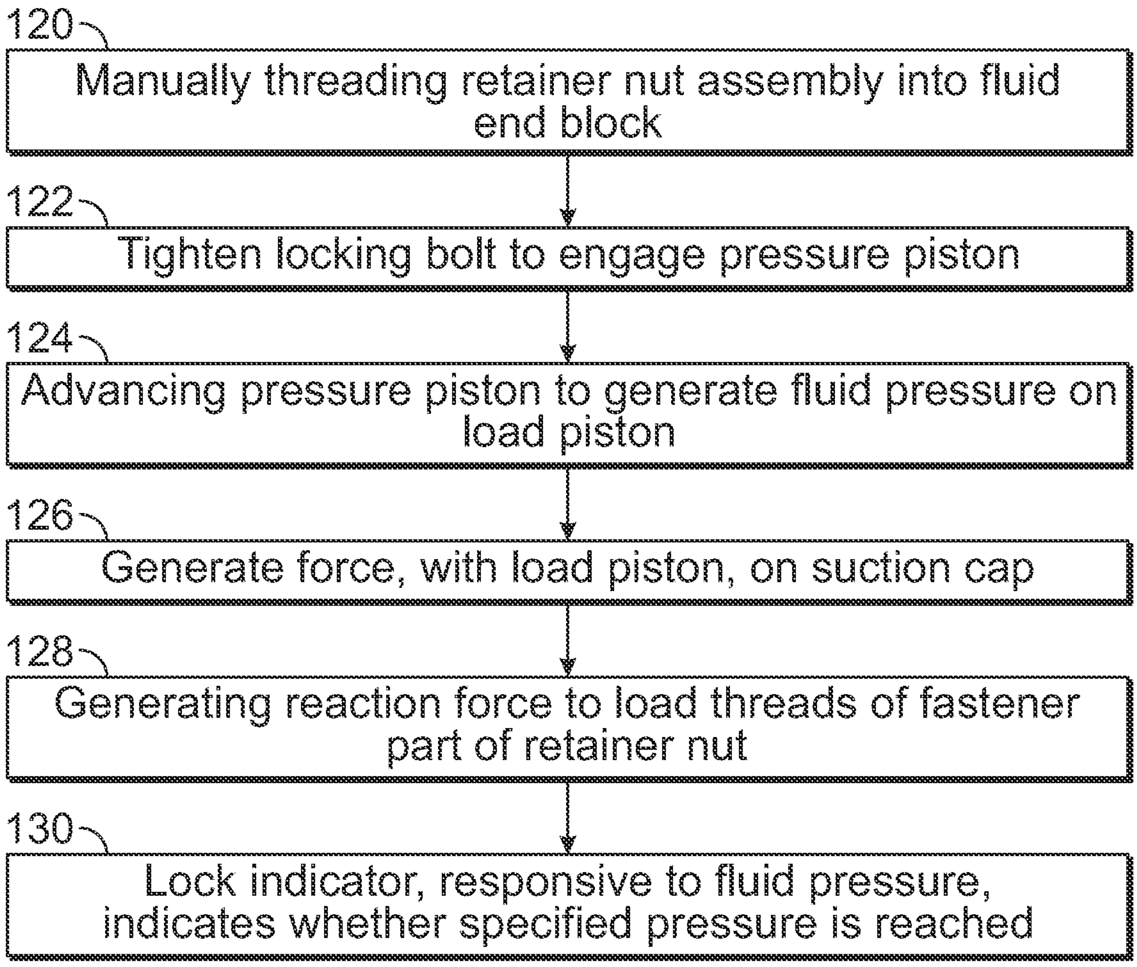
FIG. 7 is a method of installing a retaining nut according to embodiments of the disclosure.

The fastener 70 may include two or more outwardly extending tabs or lugs 80 configured to be engaged and rotated by a tool 82 (FIG. 6). The tabs 80 may each be a generally rectangular, outwardly extending part attached to the fastener 70, for example by welding, in a configuration suitably spaced apart so as to enable the application of a sufficient amount of torque to rotate and secure the fastener 70 in place using the tool 82. Each of the tabs 80 may have an opening 84 formed therethrough for receiving the tool 82.

For example, a pair of tabs 80*a*, 80*b* are arranged across from each other on opposite sides of or adjacent the outer periphery of the outer surface or second end 86 of the fastener 70 such that the openings 84 sufficiently align to enable the tool 82 to be inserted through both of the tabs. Applying a torque via the tool 82 conveys the torque through the tabs 80*a*, 80*b* to the fastener 70. A clockwise torque (as viewed in FIG. 6) with right-handed threads 70*a* formed on the fastener 70 would have the effect of advancing the fastener into the fluid end block 18, and vice versa. Two pairs of tabs 80 may be arranged at 90 degree orientations about and adjacent the periphery of the second end 86 to enable easy access via the tool 82. Other configurations of tabs or engageable features are contemplated. The tool 82 may be a cylindrical bar, for example, or any suitable means of engaging the tabs 80 and exert a suitable amount of torque to advance the fastener 70 into the fluid end block 18.

Figure 3:
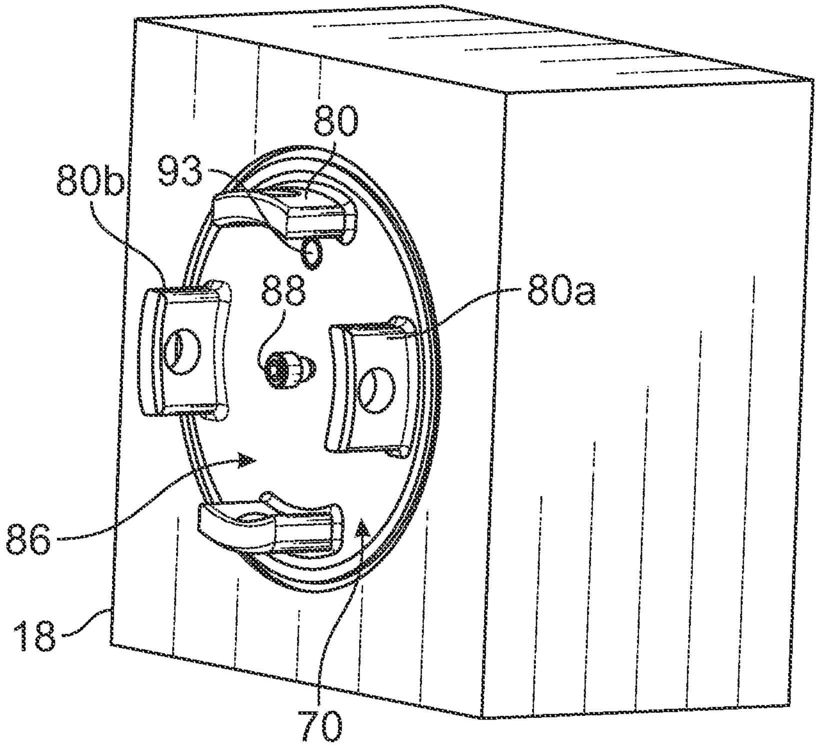
FIG. 3 is a perspective view of a retaining nut assembly positioned in a fluid end block.
Figure 4:
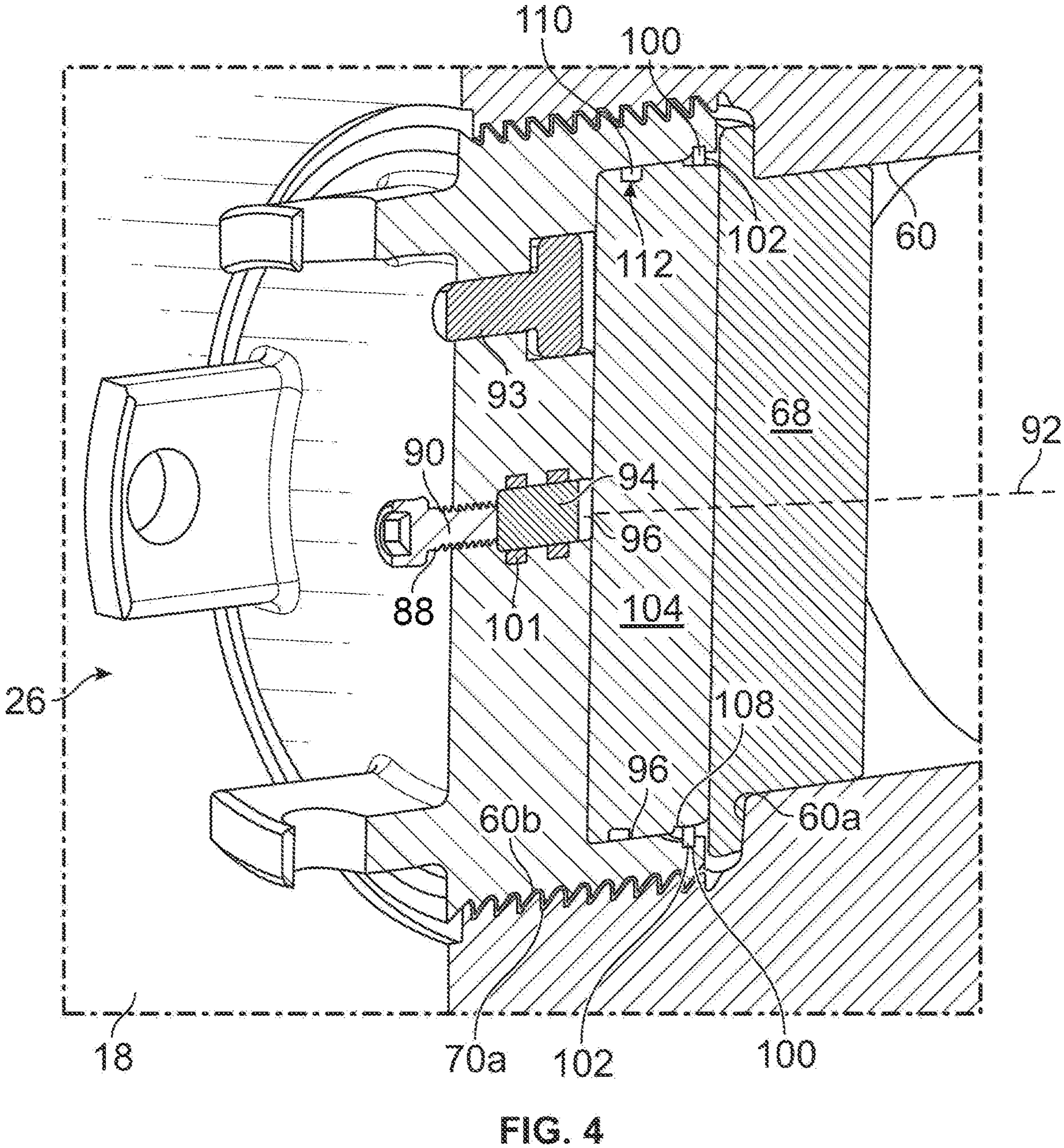
FIG. 4 is a perspective cross section view of the retaining nut of FIG. 3 positioned in a fluid end block.
Figure 5:
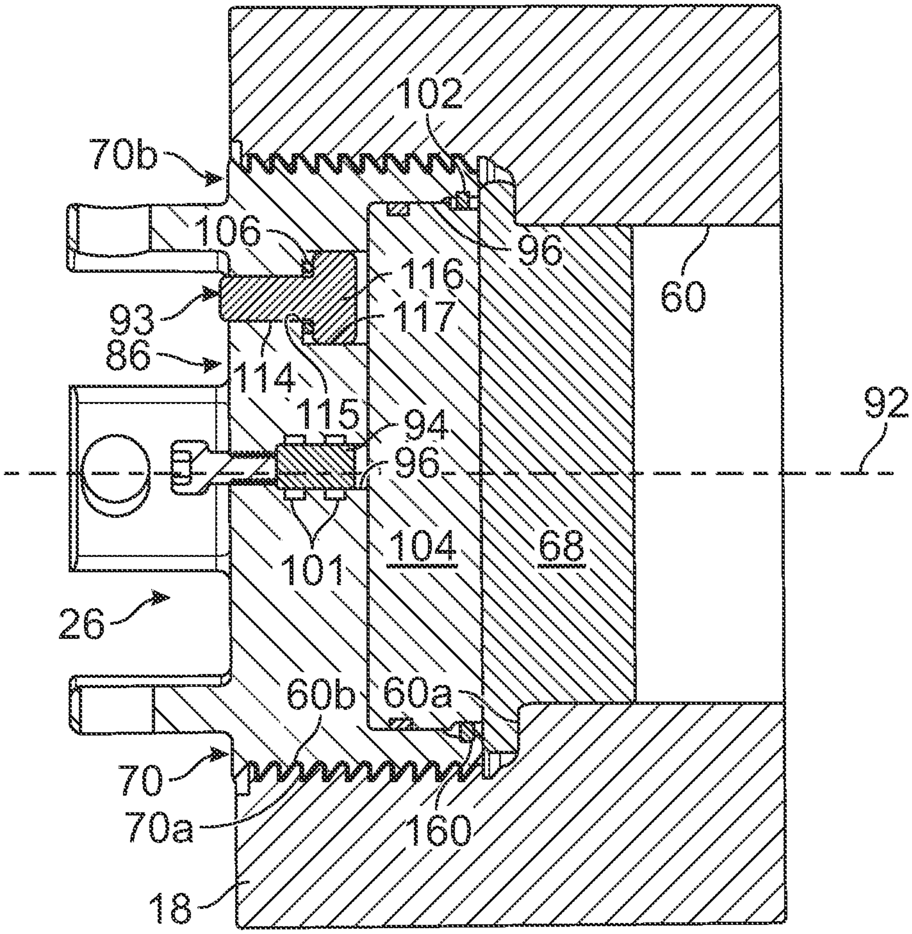
FIG. 5 is a cross section view of the retaining nut of FIG. 3 positioned in a fluid end block.

The second end 86 of the fastener 70 also, as seen in FIG. 3, includes a lock piece or locking bolt 88, which may be a threaded fastener such as a hex bolt. Insertion and rotation of the lock piece 88 applies the preload to the retainer nut assembly 26 as will be explained below. As shown in FIGS. 4-5, the lock piece 88 is threaded into the fastener 70 by engaging an internally threaded passage 90 formed in or through the fastener 70. The internally threaded passage 90 may be formed in the center of the fastener, i.e., centered on an axial center 92 of the fastener 70.

The fastener 70 also may include a lock indicator 93, which may include a piston or pressure transducer, sensor, or any suitable mechanism that responds to pressure as will be explained more fully herein and provides an indication when a specified preload force is being applied to the retainer nut assembly 26. The lock indicator 93 may be biased by a spring 106, wavy washer, or cone washer, or any suitable mechanism such that until a specified amount of force is acting on the lock indicator, the lock indicator does not extend from the second end 86. The lock indicator 93 extends outwardly from the second end 86 when a specified preload force acts on the indicator. In alternative embodiments, the lock indicator 93 may be a sensor that generates a signal indicative of the forces being sensed thereby. In alternative embodiments, the lock indicator 93 may be a green-red hydraulic bypass indicator.

In embodiments, the lock indicator 93 includes a post portion 114 disposed in a bore 115 formed in or through the fastener 70 and a piston portion 116 that is disposed in a port 117. The port 117 has a greater diameter than that of the bore 115 so as to retain the lock indicator 93 when the lock indicator is being urged outwardly by fluid pressure in the port 117.

The fastener 70 includes formed in the first end 70*a*, opposite the second end 86, a cavity 96 with an annular groove 100 formed in the sidewall of the fastener adjacent the end opposite the outer surface. The groove 100 is sized and shaped to retain a snap ring 102. The cylindrical cavity 96 is sized and shaped to movably receive the load piston 104 and, when the load piston is positioned within the cavity, the snap ring 102 is positioned to retain the load piston therein. The snap ring 102 may retain the load piston 104 by stopping against a shoulder 108 formed at the inner edge of the load piston. The shoulder 108 is configured to permit a limited amount of axial movement of the load piston 104 in the cavity 96 such that the load piston can be moved against the suction cap 68.

The fastener 70 also includes a pressure piston 94 disposed in a bore 96 formed in the fastener along the axis 92. The pressure piston 94 is provided with two or more seals 101. The seals 101 may include elastomeric O-rings, or any suitable means of sealing the bore 96 and pressure piston 94. The bore 96 is also formed on the axial center 92 and is in communication with or open to the internally threaded passage 90 such that the lock piece 88 when inserted inwardly contacts the pressure piston 94 and can exert a force against the piston. The piston 94 has an axial length that is less than the length of the bore 96 and the bore is filled with a hydraulic fluid, such as grease for example.

When the lock piece 88 is threaded inwardly and presses against the piston 94, hydraulic pressure is generated within the bore 96, which in turn is conveyed to the load piston 104. When the load piston 104 is loaded via hydraulic pressure generated by advancing the lock piece 88 pressing against the piston 94, the load piston generates pressure via the hydraulic fluid in the bore 96, and the load piston 104 exerts pressure on the cap 68. In return, a force opposite in direction is generated that urges the fastener 70 outwardly from the fluid end block 18, which preloads the threads 70*a*. Fluid pressure generated by the pressure piston 94 pushes fluid into the space between the cavity 96 and the load piston 104 and acts on the piston portion 116 of the indicator 93 to urge the indicator outwardly to provide an indication of hydraulic pressure being generated.

Changes in pressure generated by the plunger 32 within the fluid chamber 36 act indirectly on the fastener 70. When the threads 70*a* are not preloaded, the threaded connection 70*a*, 60*b* between the fastener 70 and the fluid end block 18 experiences cyclical changes of stress. When the threads 70*a* are preloaded, static stress is increased and peak to peak cyclic stress amplitude is greatly reduced. As a result, the threaded connection is more reliable, the status of the fluid end retainer nut assembly 26 is easily discernable, and the need for frequent maintenance is reduced.

INDUSTRIAL APPLICABILITY

The industrial applicability of the system described herein will be readily appreciated from the forgoing discussion. The foregoing discussion is applicable to fluid ends of reciprocating pump assemblies, in particular, for pumping fluid media in fracturing operations and similar applications.

One example of the industrial application of the system according to embodiments of the disclosure, and referring also to FIGS. 1-6, a method of installing a retainer nut assembly 26 includes manually threading the retainer nut assembly into a fluid end block 18 of a fluid end 14 of a reciprocating pump system 10. In embodiments, with the suction cap 68 in position in the fluid end block 18, and the load piston 104 positioned on the fastener 70, in step 120, the installation includes engaging a fastener portion 70 with a tool 82 and rotating/threading the fastener into the fluid end block 18. Once the retainer nut assembly 26 is fully threaded into the fluid end block 18, in step 122, a locking bolt 88 is tightened. The locking bolt 88 may be tightened by rotating and advancing the locking bolt into the fastener 70. In step 124, advancement of the locking bolt 88 engages a pressure piston 94, the advancement of which generates fluid pressure on a load piston 104. The load piston 104, in step 126, generates a force on a suction cap 68, which presses the suction cap into the fluid end block 18. In step 128, the fluid pressure generated also imparts a reaction load or force on the fastener 70, which loads the fastener threads 70*a*, in the outward direction relative to the fluid end block 18. In step 130, a lock indicator 93, which is configured to respond to the generated fluid pressure and provide an indication whether a specified installation pressure is reached, provides an indication of the generated fluid pressure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A retainer nut assembly for a fluid end of a pump system, comprising:
- a fastener comprising a generally cylindrical configuration, a first end and a second end opposite the first end, external threads configured to engage corresponding threads of a fluid end block, and a cavity formed at the first end;
- a suction cap configured to sealingly fit to the fluid end block, the suction cap including a first portion configured to engage an internal shoulder of a counterbore of the fluid end block and a second portion configured to be disposed in a reduced-diameter portion of the counterbore;
- a load piston movably disposed in the cavity and adjacent the suction cap, wherein the load piston is substantially a solid disk with a radius that is greater than a radius of the second portion of the suction cap;
- a bore formed in the fastener in communication with the cavity and provided with a hydraulic fluid;
- a pressure piston movably disposed in the bore,
  - wherein movement of the pressure piston, in the bore, is parallel to movement of the load piston in the cavity;
- a threaded passageway formed in the fastener in communication with the bore and open to the second end; and
- a locking bolt disposed in the threaded passageway, the locking bolt configured to contact the pressure piston and generate fluid pressure on the load piston with the hydraulic fluid, wherein movement of the locking bolt, in the threaded passageway, is parallel to movement of the pressure piston and the load piston.

2. The assembly of claim 1 wherein the fastener includes at least two tabs extending from the second end, the at least two tabs configured to be engaged with a tool for rotating the fastener.

3. The assembly of claim 1 wherein the load piston is generally cylindrical.

4. The assembly of claim 3 wherein the fastener further comprises an annular groove formed adjacent the first end in the cavity and a ring disposed in the groove.

5. The assembly of claim 4 wherein the ring is a snap ring.

6. The assembly of claim 5 wherein the snap ring, when positioned within the groove, is configured to retain the load piston in the cavity.

7. The assembly of claim 6 wherein the load piston includes a shoulder configured to engage the snap ring while permitting a limited amount of axial movement of the load piston in the cavity.

8. The assembly of claim 7 further comprising a seal disposed on the load piston that is configured to seal against the fastener.

9. The assembly of claim 1 comprising at least one seal disposed between the bore and pressure piston.

10. The assembly of claim 1 wherein a head of the locking bolt extends outside the second end of the fastener.

11. The assembly of claim 1 wherein the load piston overlaps a center axis of the fastener.

12. The assembly of claim 1 wherein the bore is a first bore and the assembly further comprises:

an indicator including a piston disposed in a port in communication with the first bore and configured to provide an indication of the amount of fluid pressure that is generated on the load piston, the piston including:

a piston portion disposed in the port; and a post portion disposed through a second bore of the fastener, the port having a greater diameter than the second bore.

13. The assembly of claim 12 wherein the piston portion has a greater diameter than the second bore, and wherein the greater diameter of the piston portion compared to the second bore is configured to retain the indicator when the indicator is being urged outwardly by the fluid pressure generated in the first bore.

14. The assembly of claim 12 wherein the piston is biased toward the load piston and extends from the second end when fluid pressure generated in the first bore meets or exceeds a specified amount.

15. The assembly of claim 12 wherein the indicator comprises a sensor.

16. A fluid end for a reciprocating pump system, comprising:

a fluid end block defining a fluid chamber;

a plunger reciprocally disposed in the fluid chamber to generate fluid pressure therewithin;

an outlet fluid passage formed in the fluid end block in fluid communication with the fluid chamber, the outlet fluid passage including an outlet valve;

an inlet fluid passage formed in the fluid end block in fluid communication with the fluid chamber, the inlet fluid passage including an inlet valve; and a retainer nut assembly including:

a fastener comprising a generally cylindrical configuration, first and second ends, external threads configured to engage corresponding threads of the fluid end block, and a cavity formed at the first end;

a suction cap configured to sealingly fit to the fluid end block, the suction cap including a first portion configured to engage an internal shoulder of a counterbore of the fluid end block and a second portion configured to be disposed in a reduced-diameter portion of the counterbore;

a load piston movably disposed in the cavity and adjacent the suction cap, wherein the load piston is substantially a solid disk with a radius that is greater than a radius of the second portion of the suction cap;

a bore formed in the fastener in communication with the cavity and provided with a hydraulic fluid;

a pressure piston movably disposed in the bore, wherein movement of the pressure piston, in the bore, is parallel to movement of the load piston in the cavity;

a threaded passageway formed in the fastener in communication with the bore and open to the second end; and a locking bolt disposed in the threaded passageway, the locking bolt, when inserted into the threaded passageway, configured to contact the pressure piston and generate fluid pressure on the load piston with the hydraulic fluid, wherein movement of the locking bolt, in the threaded passageway, is parallel to movement of the pressure piston and the load piston.

17. A method of installing a retainer nut assembly into a fluid end block for a reciprocating pump system, the method comprising:

threading a fastener into the fluid end block;

tightening a locking bolt disposed in the fastener and engaged therewith via threads;

engaging and advancing a pressure piston disposed in a bore of the fastener with the locking bolt;

generating fluid pressure in the bore with the pressure piston;

applying the fluid pressure to a load piston; and generating, with the load piston, a force on a suction cap installed in the fluid end block, wherein the locking bolt, the pressure piston, and the load piston move in parallel, wherein the suction cap includes a first portion configured to engage an internal shoulder of a counterbore of the fluid end block and a second portion configured to be disposed in a reduced-diameter portion of the counterbore, and wherein the load piston is substantially a solid disk with a radius that is greater than a radius of the second portion of the suction cap.

18. The method of claim 17, further comprising:

transmitting a reaction load via the fluid pressure; and acting on the fastener with the reaction load to preload the fastener.

19. The method of claim 18 wherein preloading the fastener comprises applying the reaction load to external threads of the fastener.

20. The method of claim 17 wherein the load piston is disposed in and sealed to a cavity formed in the fastener.

* * * * *